UNITED STATES PATENT OFFICE.

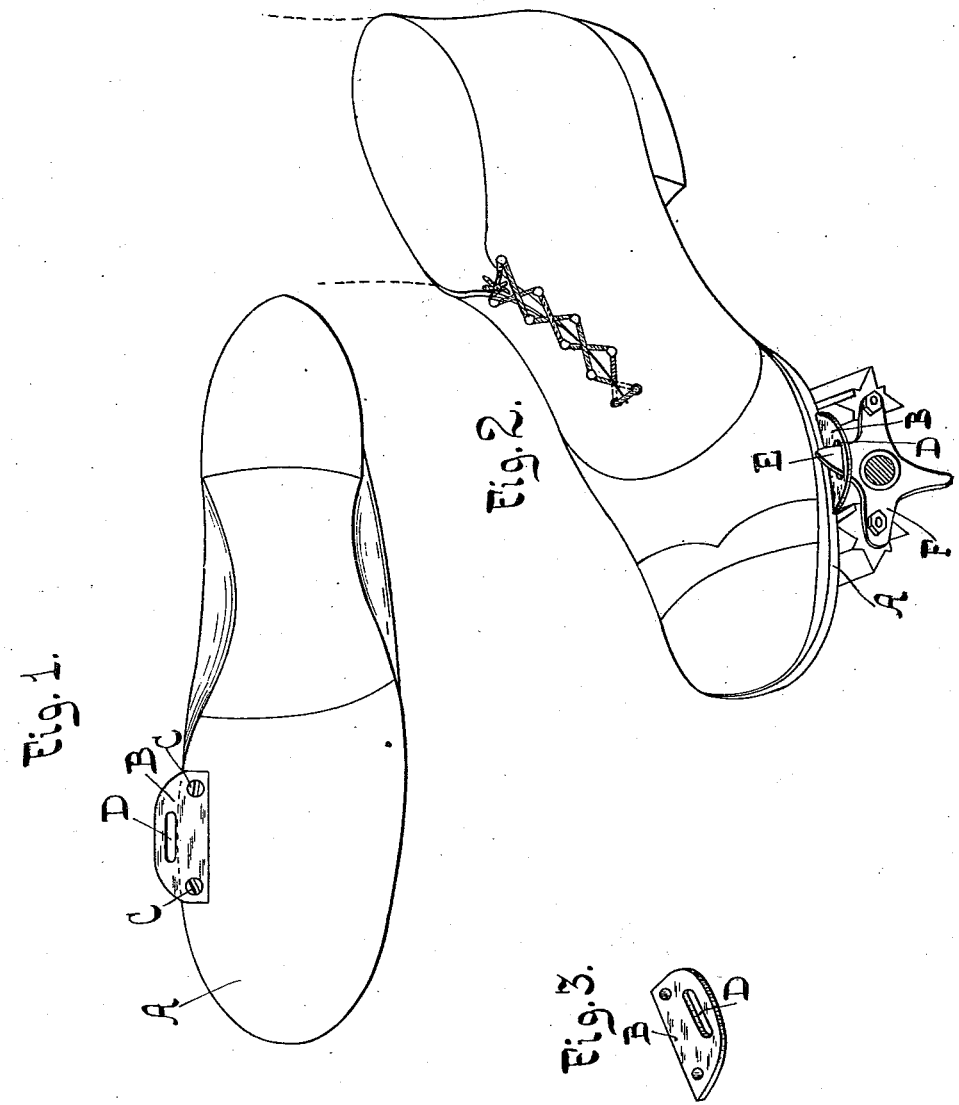

THOMAS O'BRIEN, OF NEW YORK, N. Y.

BICYCLE-SHOE.

SPECIFICATION forming part of Letters Patent No. 537,225, dated April 9, 1895.

Application filed September 20, 1894. Serial No. 523,624. (No model.)

*To all whom it may concern:*

Be it known that I, THOMAS O'BRIEN, a citizen of the United States of America, and a resident of the city, county, and State of New York, have invented certain new and useful Improvements in Bicycle-Shoes, of which the following is a specification.

My invention relates to improvements in bicycle pedal shoes, and it has for its object to provide an attachment for shoes by which the rider's power upon the pedal cranks is increased.

Another object of my device is to provide a connection between the shoe and pedal which is applicable to ordinary every-day shoes as well as to bicycle riding shoes proper by which no modification in shoes nor pedals now in general use is required.

The nature of my invention will be fully understood from the following description and claims when taken in connection with the annexed drawings, in which—

Figure 1 is a bottom view of a shoe having my attachment. Fig. 2 is a perspective view of the shoe and pedal connected. Fig. 3 is a perspective of the device detached.

Similar letters of reference designate corresponding parts throughout the several views of the drawings.

Referring to the drawings, the letter A designates the sole of a shoe; B, the plate attachment; C C, the screws which secure the plate to the sole of the shoe, and D the slot in the plate which drops down over the inside shoe guard E of the pedal F.

The plate B, may be of any suitable material and attached as shown in Fig. 1 or it may be built in between the parts of the sole or between the sole and welt, when making the shoe.

By the construction above described, it is obvious that the feet of the rider are brought into more intimate and secure relation to the pedals and the rider is enabled to exert power in greater degree upon the driving cranks.

It is evident that my slotted plate is adapted to all styles of bicycle, tricycle, or velocipede pedals and that it is light, simple, cheap and effective.

If desired a plate may be secured to each side of the shoe to receive both pedal guards. The plate may also be provided with two or more slots arranged parallel with respect to the edge of the sole.

What I claim as new is—

1. The combination with a shoe, of a plate attached to the sole thereof having a portion projecting laterally beyond the sole and containing a slot extending in the longitudinal direction of the shoe for receiving a projection on the pedal of a velocipede, substantially as and for the purpose set forth.

2. A plate for attachment to bicycle shoes, provided with one or more holes for its attachment to the shoe, and with a slot near its outer edge adapted to fall beyond the sole of the shoe when the plate is attached, and to receive the pedal guard, substantially as and for the purpose set forth.

In testimony that I claim the foregoing as my invention I have signed my name, in presence of two witnesses, this 19th day of September, 1894.

THOMAS O'BRIEN.

Witnesses:
EUGENE SWEENEY,
CHAS. F. L. SUDERBERG.